United States Patent

Ban

[15] 3,682,480

[45] Aug. 8, 1972

[54] TAPE PLAYER FOR PLAYING A PLURALITY OF ENDLESS MAGNETIC TAPE CARTRIDGES

[72] Inventor: Itsuki Ban, 829, Higashi-Oizumimachi, Nerima-ku, Tokyo-to, Japan

[22] Filed: Feb. 4, 1970

[21] Appl. No.: 8,518

[30] Foreign Application Priority Data

Feb. 5, 1969 Japan ........................44/8167

[52] U.S. Cl. ..............274/4 F, 179/100.2 Z, 274/4 A

[51] Int. Cl. ..............................................G11b 23/12

[58] Field of Search ........274/4 B, 4 C, 4 E, 4 F, 4 A; 242/55.19 A, 197–200, 180, 181; 179/100.2 Z; 353/15

[56] References Cited

UNITED STATES PATENTS

| | | | |
|---|---|---|---|
| 3,009,024 | 3/1964 | Eash | 274/4 B |
| 3,126,162 | 3/1964 | MacKenzie | 242/55.19 A |
| 3,083,269 | 3/1963 | Gaubert | 274/11 E |
| 3,127,178 | 3/1964 | Osborne | 274/4 F |
| 3,556,535 | 1/1971 | Chabot | 274/4 F |

*Primary Examiner*—Leonard Forman
*Assistant Examiner*—Dennis A. Dearing
*Attorney*—Jacobs & Jacobs

[57] ABSTRACT

A tape player for playing a plurality of endless magnetic tape cartridges received in a container, comprising a rotatable container accommodating the plurality of endless magnetic tape cartridges, a mechanism to stop rotation of the container to bring the cartridge to be played to a predetermined previous position, a movable device for reciprocating the cartridge between the previous position and a predetermined playing position, tape-reproducing members comprising a capstan and a magnetic head for playing the cartridge moved to the playing position, and a control device for controlling operation of said movable device to move said movable device from the playing position to the previous position in response to completion of the play of the cartridge.

1 Claim, 8 Drawing Figures

TAPE PLAYER FOR PLAYING A PLURALITY OF ENDLESS MAGNETIC TAPE CARTRIDGES

BACKGROUND OF THE INVENTION

The present invention relates to a tape player for playing a plurality of endless magnetic tape cartridges.

Various multi magnetic tape cartridge players have been proposed heretofore. One of those is such that the container which contains a plurality of tape cartridges is moved to move one cartridge to a predetermined position where it is played by a reproducing member composed of a capstan, a magnetic head and others provided adjacent to the playing position. The cartridge to be played is retracted from the reproducing member and moved away from the playing position after play is completed. Heretofore, such movement has been made by a solenoid having a reciprocable plunger. In view of the distance in which the cartridge is moved and of the volume and weight thereof, the solenoid is required to be large and there it consumes large amounts of power. Problems derived from the use of such solenoid result from the space in which it is provided and from maintenance thereof. Particularly, if the tape player relying on a battery as electric source is to be used, it is impossible to do so since allowable electrical consumption is limited as source.

The inventor has succeeded in obtaining a novel and useful tape player having a new mechanism for moving the cartridge without use of a large solenoid.

SUMMARY OF THE INVENTION

It is a primary object of the invention to provide a tape player for playing a plurality of endless magnetic tape cartridges, wherein the plurality of cartridges are accommodated in a rotatable container, rotation of the container is controlled to successively move the cartridge to a predetermined previous position, the cartridge is moved by cartridge shifting means from the previous position to a predetermined playing position and is played by a reproducing member composed of a capstan, a magnetic head and others provided adjacent to the playing position, the cartridge is further moved by the cartridge shifting means to the previous position in response to completion of the play of the cartridge.

Another object of the invention is to provide a tape player for playing a plurality of endless magnetic tape cartridges which is simple in its structure and manufactured at low cost and in which the cartridge shifting means relies on rotational force of the capstan and on the bias of at least one spring as drive power source.

A further object of the invention is to provide a tape player for playing a plurality of endless magnetic tape cartridges which is capable of pre-designating the cartridge and the record-track to be played on the tape to automatically select and successively play the same as designated.

Still another object of the invention is to provide a tape player for playing a plurality of endless magnetic tape cartridges which enables the rotational force to be used as drive power source for magnetic head shifting means moving the magnetic head to a position corresponding to record-tracks and which does not rely on such drive power source like solenoid requiring large dimension and more power consumption.

Yet another object of the invention is to provide a tape player for playing a plurality of endless magnetic tape cartridges, wherein an electrical signal is produced after all designated record-tracks are played, the cartridge shifting means being actuated to move the cartridge from the playing position to the previous position in response to the signal, and exchange of the cartridge to be played is automatically effected.

Further objects and additional advantages of the invention will become apparent from the following detailed description and accompanying drawings, wherein:

DESCRIPTION OF THE PREFERRED EMBODIMENTS

Figure 1:
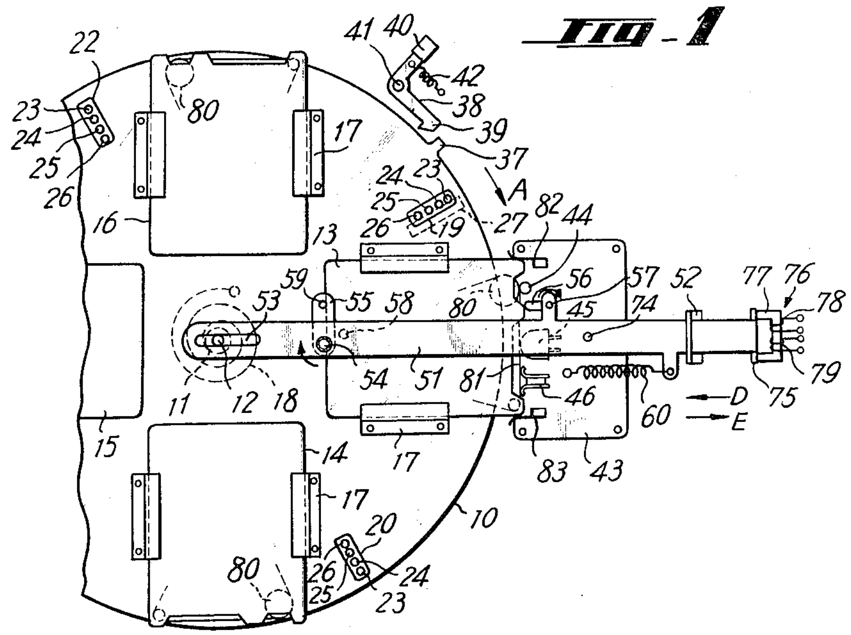
FIG. 1 is a plan view of one embodiment of a tape player for playing a plurality of endless magnetic tape cartridges according to the invention, partially broken away.
Figure 2:
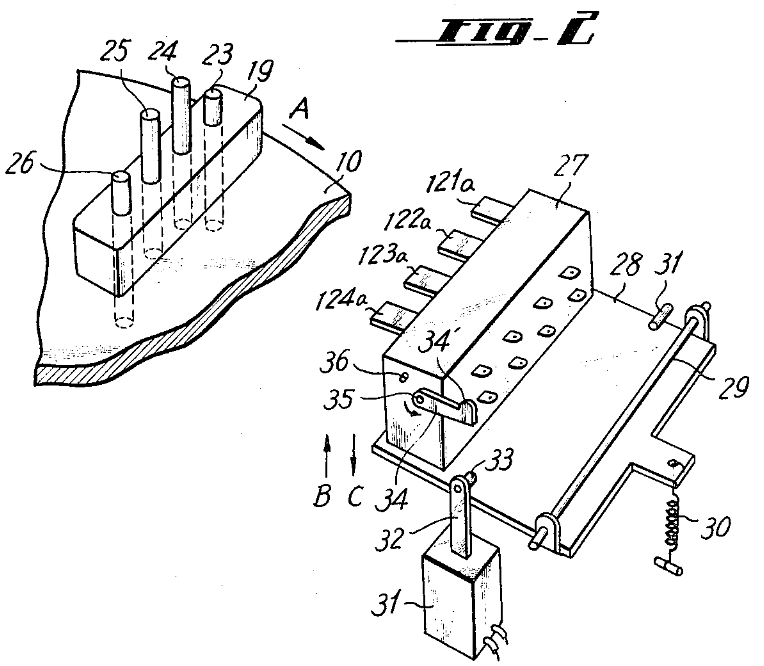
FIG. 2 is a perspective view showing a mechanism for stopping rotation of the container in FIG. 1 and a mechanism for designating the cartridge and record-track on the tape to be played.

Referring to FIG. 1, a tape player for playing a plurality of endless magnetic tape cartridges according to the invention comprises a substantially disk-shaped container on which a plurality of endless magnetic tape cartridges are horizontally and radially mounted. The container 10 is rotatably supported by a sleeve 11 over a shaft 12 mounted to a bottom plate of a player housing (not shown) at the center of the container. The container 10 is adapted to receive four endless magnetic tape cartridges 13 to 16. Guide means 17 are suitably provided on the container 10 to receive the cartridges and these guide means 17 may comprise parallel spaced rails secured in upright extension to the container. The separation of the two portions of the guide means 17 is just sufficient to accommodate a tape cartridge in sliding relation between the guide means so that no possible canting or other undesirable motion of the cartridge is possible when the same is inserted between the guide means upon the container 10. The container 10 is given a rotational force in the direction of the arrow A by a coil spring 18 as indicated by the dotted line. Support elements 19 to 22 (21 is on the broken part) are radially disposed on the container 10 to correspond to the cartridges 13 to 16 and each has four slidable pushbutton rods 23 to 26. These rods are cylindrical and are received in cylindrical holes (not shown) bored through each of the support elements. The pushbutton rods 23 to 26 frictionally engage the support elements and are adapted to be depressed or drawn up by hand. Manual depression of the pushbutton rods allows the lower end thereof to extend from the container 10 underneath thereof. A switch block 27 is shown as indicated by the dotted line in FIG. 1 and contains record-track selecting switches 121 to 124 (FIG. 8) which, as will be fully described later, are selectively actuated by the pushbutton rods 23 to 26. An enlarged detail view of the switch block 27 and the support elements 19 is shown in FIG. 2. The switch block 27 is mounted to a swing plate 28 swingably supported on a shaft 29 mounted in the player housing (not shown). Extended from the switch block 27 at opposite sides thereof are actuators 121*a* to 124*a* of the track selecting switches 121 to 124. The swing plate 28 is biased in the direction of the arrow B by a spring 30 but inward movement of the swing plate is limited by a stopper pin 31 as in the state shown in FIG. 2. The swing plate 28 is engaged by a pin 33 fixed to a plunger 32 of a solenoid 31 and is caused to be swung in the direction of the arrow C against the bias of the spring 30 when the solenoid 31 is energized. A lever 34 is pivoted by a point 35 to the switch block 27 and is given a rotational force by a spring (not shown) in the direction of the arrow as shown. The lever 34 has the end 34′ which contacts the container 10 underneath thereof and is normally in the position as shown in FIG. 2. The lever 34 is moved away from the container 10 underneath thereof when the solenoid 31 is energized to swing the swing plate 28 in the direction of the arrow C. As a result, the lever 34 is rotated by the spring (not shown) in the direction of the arrow as shown until it comes in contact with a stopper pin 36 on the switch block, and thus is vertical. When the solenoid 31 is deenergized, the swing plate 28 is intended to return in the direction of the arrow B by the bias of the spring 30 but restoration of the swing plate 28 is prevented by the lever 34 which is vertically swung and engages the container 10 underneath thereof. When the container 10 is rotated by the bias of the coil spring 18 (FIG. 1) in the direction of the arrow A, the lever 34 is clockwise rotated by the frictional force between the container 10 and the lever 34 and returned to a position as shown in FIG. 2 while the swing plate 28 is returned to its original position. As shown in FIG. 2, depression of the pushbutton rods 23, 26 allow the lower ends thereof to project from the container 10 underneath thereof, and in the course in which the container 10 is rotated by the bias of the coil spring 18 in the direction of the arrow A, the pushbutton rods 23, 26 engage the actuators 121*a*, 124*a* to prevent the container 10 from rotating.

Referring back to FIG. 1, there is shown the container 10 that is prevented from rotating by engagement relation between the pushbutton rods supported by the support element 19 and the switch block 27, and that is brought to the playing position corresponding to the support element 19. The container 10 is provided with a protruding part 37 at the periphery thereof. A latch lever 38 is swingably mounted to a fixed axis 41 and has one end including a pawl portion 39 and the other end carrying a knob 40. The latch lever 38 is given the clockwise rotational force by a spring 42. The pawl portion 39 engages the container 10 at the periphery thereof. And, whenever the container 10 rotates round its axis, the pawl portion 39 engages the protruding part 37 of the container 10 to stop rotation of the container 10. The latch lever 38 is swung against the bias of the spring 42 by manually grasping the knob 40 to disengage the pawl portion 39 from the protruding part 37 of the container 10 thus allowing the container 10 to rotate in the direction of the arrow A. Where the pushbutton rods 23 to 26 of the respective support elements 19 to 22 are drawn in a manner that they are not extended from the container 10 underneath thereof, energy is stored in the coil spring 18 by allowing the container 10 to be manually rotated in the counterclockwise direction. At this moment, the protruding portion 37 does not stand in the engagement relation with the pawl portion 39 and may pass beyond the pawl portion 39. When manual rotation of the container 10 is stopped, the container 10 is rotated by the bias of the coil spring 18 in the direction of the arrow A and is prevented from rotation by engaging the protruding portion 37 with the pawl portion 39 of the latch lever 38. At this point, none of the cartridges 13 to 16 are brought to the playing position.

A deck 43 to which a capstan 44, a magnetic head 45, and an endmark detector 46 or others are mounted in spaced away from the bottom plate of the player housing (not shown) and is provided parallel and coplanar to the container 10. The capstan 44 is rotatably journaled by a bearing 47 (FIG. 5) mounted to the deck 43 and a bearing 49 (FIG. 5) mounted to a base plate 48 (FIG. 5), and has the upper end extending from the deck 43. The capstan 44 is provided with a flywheel 50 (FIG. 5) mounted downwardly of the deck 43. The capstan 44 is adapted to be rotatably driven when the flywheel 50 is belt driven by an electronic motor (not shown). The magnetic head 44 as will be described in detail later is adapted to be upwardly and downwardly moved.

Figure 3:
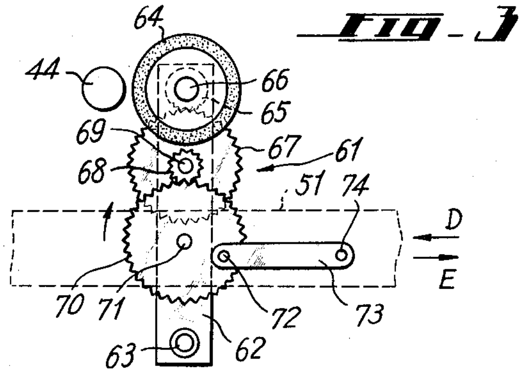
FIGS. 3 and 4 are schematic views explanatory of a mechanism for moving the reciprocating lever in FIG. 1.
Figure 5:
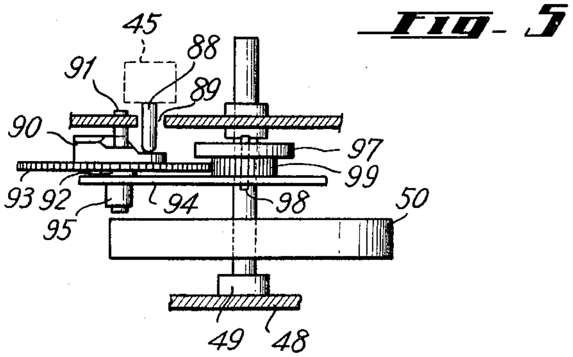
FIGS. 5, 6 and 7 show a shifting mechanism for the magnetic head in FIG. 1.

A reciprocating lever 51 is spaced away from the container 10 and the deck 43 and slidably supported by a guide 52 on the base plate 48 (FIG. 5). The lever 51 includes a slot 53 which receive the upper end of the shaft 12 upwardly extending from the container 10. The lever 51 is linearly reciprocated when regulated by the interrelation between the slot 53 and the shaft 12 and by the guide 52. Pivoted on a pin 54 at one portion of the lever member 51 is a first arm 55, and a second arm 56 is pivoted on a pin 57 at another portion thereof. The first arm is biased in the direction of the arrow by a spring (not shown) but inward movement of the arm is limited by a stopper pin 58. The second arm is biased in the direction of the arrow by a spring (not shown) but inward movement of the arm is limited by a stop (not shown). A pin 59 is mounted to the first arm 55 underneath thereof between which and the end of the second arm 56 the cartridge 13 is held. The reciprocating lever 51 is given the movable force in the direction of the arrow D by the bias of a spring 60. There is shown in FIG. 3 a shifting means 61 for shifting the reciprocating lever 51 in the direction of the arrow E against the bias of the spring 60.

The shifting means 61 includes a swing lever 62 swingably mounted on a shaft 63 on the deck (FIG. 1). A rubber covered frictional wheel 64 and a gear 65 connected to each other are rotatably supported on an axis 66 on the swing lever 62. The frictional wheel 64 as will be described later is caused to abut against the capstan 44 by rotation of the swing lever 62 from the position as shown to the clockwise direction and is rotatably driven by the capstan. Integrally formed gears 67 and 68 are rotatably supported on an axis on the swing lever 62. The gear 67 is adapted to mesh with the gear 65. A gear 70 is rotatably mounted to an axis 71 mounted to the swing lever 62 to mesh with the gear 68. The gears 65, 67 and 68 constitute a reduction gearing and rotation of the frictional wheel 64 is reduced to be imparted to the gear 70. A link member 73 is coupled to connection between a pin 72 mounted to a portion offset from the center of the gear 70 and a pin 74 mounted to the reciprocating lever 51. When the reciprocating lever 51 is moved from the position as shown in FIG. 1 in the direction of the arrow D by the bias of the tension spring 60, the swing lever 62 is counterclockwise swung by the link 73 to allow the frictional wheel 64 to abut against the capstan 44. As a result, the frictional wheel 64 is rotatably driven and the gear 70 is rotated in the direction of the arrow as shown. As the gear 70 is rotated, the reciprocating lever 51 is further moved by the link 73 in the direction of the arrow D. When the gear 70 is approximately half rotated, the lever 51 is brought to a position where it is moved to the extreme position in the direction of the arrow D. When the gear 70 is further rotated, movement of the reciprocating lever 51 is reversed and moved in the direction of the arrow E. When the gear 70 rotates substantially round its axis, a magnetic piece 75 fixed to the right end of the reciprocating lever 51 is close to the magnetic circuit open end of a core 77 of an electromagnet 76 and is attracted to the electromagnet 76. Upon one rotation of the gear 70, the swing lever 62 is clockwise rotated by the link 73 and since the lever 51 has been attractively engaged by the electromagnet 76, abutment force between the frictional wheel 64 and the capstan 44 decays to stop rotation of the frictional wheel 64 and of the gear 70. This is shown in FIG. 3. Abutment force between the frictional wheel 64 and the capstan 44 is given by the bias of the tension spring 60 and is increased in accordance with the bias of the spring 60 to secure power transmission. The electromagnet 76 has two coils, namely first and second coils 78 and 79 wound to the core 77 operation of which is described later.

When the reciprocating lever 51 is retained against the bias of the spring 60 after the magnetic piece 75 has been attracted to the electromagnet 76, the cartridge is at the rear edge thereof pushed by the first arm 55 through the pin 59 and disposed to the playing position where a pinch roller 80 received in the cartridge abuts against the capstan 44 through an endless magnetic tape 81 stored in the cartridge. The tape 81 in the cartridge is drivingly fed with slidably contacting the magnetic head 45 and the endmark detector 46 in cooperation of the capstan 44 and the pinch roller 80 and is thereby reproduced. The relative position of the cartridge held in the playing position to the reproducing members such as the capstan 44 and the magnetic head 45 is immovably maintained by allowing the fore portion of the cartridge to be held between a pair of guide members 82 and 83 provided on the deck 43. When the electromagnet 76 as will be described later loses the attractive force of the magnetic piece 75, the lever 51 is moved by the bias of the tension spring 60 in the direction of the arrow D. At this time, the cartridge is retractively moved as the leading edge thereof is pushed by the second arm 56. As the cartridge is retractively moved and the fore portion of the cartridge passes out of the guide members 82, the electromagnet 76 as will be described later loses the attractive force of the magnetic piece 75 at the same time the solenoid 31 (FIG. 2) is energized so that the pushbutton rods 23 to 26 do not stand in the engagement relation with the switch block 27 whereby the container 10 is rotatably driven by the coil spring 18 in the direction of the arrow A. With rotation of the container 10, the next cartridge is interposed between the first and second arms 55 and 56 whereas rotation of the container 10 is stopped by the engagement relation of the pushbutton rods 23 to 26 and the switch block 27. In the course in which the cartridge is interposed between the first and second arms 55 and 56, the second arm 56 is rotated as it is pushed by the fore portion of the cartridge to allow the cartridge to be interposed between the arms in a smooth manner. After the container 10 has been prevented from rotating, the direction of movement of the reciprocating lever 51 is reversed and the reciprocating lever is moved in the direction of the arrow E so that the cartridge is advancedly moved as the rear edge of the cartridge is pushed by the pin 59 of the first lever 55. The cartridge advancedly moved is such that the fore portion thereof is interposed between the guide members 82 and 83, and movement of the cartridge is stopped since the pinch roller 80 abuts against the capstan 44 just before the lever 51 is engaged by the electromagnet 76. Where the reciprocating lever 51 is engaged by the electromagnet 76, abutment force of the capstan 44 against the pinch roller 80 in the cartridge is obtained by a spring (not shown) urging the first arm 55 in the direction of the arrow. It will be apparent from the foregoing description the cartridges 13 to 16 stored in the container 10 are successively brought to the playing position and played in relation to reciprocal movement of the reciprocating lever 51 and rotation of the container 10.

Figure 4:
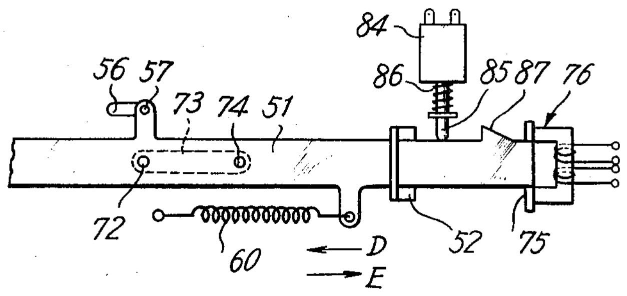

Referring to FIG. 4, means is shown so that movement of the lever 51 which is reciprocated by the shifting means 61 (FIG. 3) is controlled to securely establish operation that the cartridge is interposed between the first and second arms 55 and 56. In FIG. 4, similar numerals are used to illustrate like parts in FIGS. 1 and 3. A solenoid 84 is provided in opposition to the side edge of the reciprocating lever 51 and a plunger 85 for the solenoid is at the end elastically engaged by the side edge of the lever 51 by the bias of a spring 86. When the lever 51 is disengaged from the electromagnet 76 and is moved in the direction of the arrow D, a hook portion 87 is engaged by the plunger 85 to stop movement of the lever 51. Upon stoppage of movement of the lever 51, the frictional wheel 64 is away from the capstan 44 to prevent rotation of gear 70 after half a rotation. In the state in which the lever 51 is prevented from movement by engaging the hook portion 87 with the plunger 85, the container 10 is rotated to interpose the next cartridge between the first and second arms 55 and 56. In response to close of an electrical switch (not shown) which detects that the container is prevented from rotating and the cartridge is interposed in a predetermined position, the solenoid 84 is thus energized. Upon energization of the solenoid 84, the plunger 85 is attracted against the bias of the spring 86 and moved to a position where it is released from the hook portion 87. As a result, the reciprocating lever 51 is slightly moved by the bias of the tension spring 60 in the direction of the arrow D and the frictional wheel 64 abuts against the capstan 44 to rotate the gear 70 again. With rotation of the gear 70, the lever 51 is retractively moved in the direction of the arrow E to a position it is engaged by the electromagnet 76.

Figure 6:
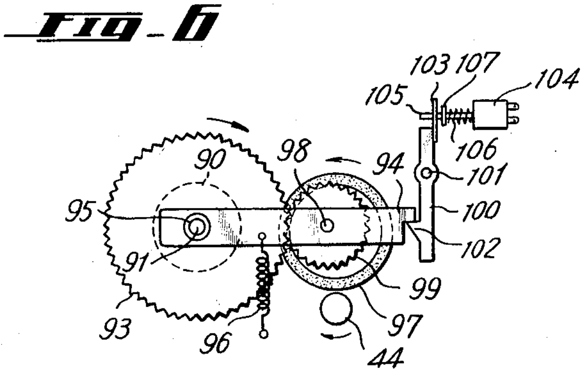
Figure 7:
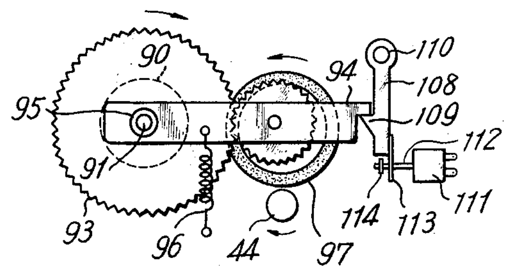

FIGS. 5, 6 and 7 show magnetic shifting means for positioning the magnetic head 45 to a plurality of different predetermined fixed points across the width of the tape 81 for reproducing a plurality of discrete and separate record-tracks upon the tape 81 within the cartridge, wherein similar numerals are used to illustrate like parts in FIG. 1. The magnetic head 45 is firmly secured to a support plate (not shown) mounted on the deck 43 and urged downwardly. A pin 88 is fixed to the support plate (not shown) underneath thereof and passes through an aperture 89 bored through the deck 43 and extends downwardly of the deck 43. The rounded buttom end of the pin 88 is arranged to ride on a stepped face cam 90. The cam 90 is arranged to shift the magnetic head 45 into a plurality of discrete record-tracks (four tracks in the example as shown) on the tape 81. The cam 21 comprises a plurality of flat steps (four flat steps in the example as shown) which correspond to the respective record-tracks on the tape and are different to one another in elevation. Ramps are provided between the flat steps of the cam 90. The lowest flat step of the cam 90 positions the magnetic head 45 at the lowest record-track (first track) on the tape 81. The pin 88 assures this. As will be described later, when the cam 45 is rotated by one step by cam driving means, the pin 88 rides up the adjacent ramp to the next flat step of the cam. The cam 90 is rotatably supported by a sleeve 92 over a vertically extending shaft 91 mounted to the deck 43. A gear 93 is mounted with the face cam 90 to the sleeve 92. A swing lever 94 is swingably supported by a further sleeve 95 over the shaft 91. The swing lever 94 is urged in the clockwise direction by a tension spring 96 (FIGS. 6 and 7). A rubber covered frictional wheel 97 is supported by an axis 98 pivotally mounted to the swing lever 94. The frictional wheel 97 is secured at a portion offset from the center thereof to the axis 98. The frictional wheel 97 as will be described later is caused to abut against the capstan 44 by rotation of the swing lever 94 from the position as shown in FIGS. 6 and 7 to the clockwise direction and is rotatably driven by the capstan 44. A gear 99 is supported with the frictional wheel 97 by the axis 98. The gear 99 is adapted to mesh with the gear 93. The gears 99 and 93 constitute a reducing gearing and rotation of the frictional wheel 97 is reduced to be imparted to the face cam 90. The rotational force of the swing lever 94 due to the tension spring 96 is normally stopped by a latch lever 100 in FIG. 6 or by a latch lever 108 in FIG. 7. The latch lever 100 is swingably provided to a pin 101 and is given the clockwise rotational force by a spring (not shown). The latch lever 100 includes hook portion 102 engageable with the free end of the swing lever 94, and a bent portion 103. A plunger 105 of a solenoid 104 passes through a hole (not shown) formed on the bent portion 103. The plunger 105 is attracted against the bias of a spring 106 when the solenoid 104 is energized. FIG. 6 shows that the solenoid 104 is in an energized condition. The swing lever 94 is engaged by the latch lever 100 when the solenoid 104 is energized. Deenergization of the solenoid 104 causes the plunger 105 to be projected by the bias of the spring 106 and thus a flange 107 on the plunger 105 comes in contact with the bent portion 103. In this manner, the latch lever 100 is moved against the bias of the spring (not shown) to a position where it is released from the swing lever 94. The swing lever 94 which has been released from the latch lever 100 is clockwise rotated by the bias of the tension spring 96 to allow the frictional wheel 97 to abut against the capstan 44 and be rotated thereby. The solenoid 104 is adapted to be supplied with current in pulse fashion by means of a control circuit (not shown) so that the solenoid 104 may be energized immediately after deenergization thereof and the latch lever 100 is returned to its original position while the frictional wheel 97 is rotated. Since a portion away from the center of the frictional wheel 97 is firmly mounted to the axis 98, the swing lever 94 is swung as the frictional wheel is rotated. When the frictional wheel is driven and substantially rotates round its axis by the capstan, the free end of the swing lever 94 engages the hook portion 102 of the latch lever 100, and the swing lever is again engaged by the latch lever 100. When the frictional wheel 94 is further rotated at a certain angle to make a revolution from the starting point, abutment force of the frictional wheel 97 against the capstan 44 is caused to be zero to stop rotation of the frictional wheel 97. Namely, the frictional wheel 97 is made rotatable round its axis whenever the solenoid 104 is cut off current supply in pulse manner.

Swingable movement of the swing lever 94 in FIG. 7 is normally arrested by engaging the free end of the swing lever 94 with a hook portion 109 of the latch lever 108 swingably supported by a pin 110. The latch lever 108 is given the clockwise rotational force by a spring (not shown). A plunger 112 of a solenoid 111 passes through a hole (not shown) formed on the bent portion 113 of the latch lever 108. When the solenoid 111 is energized in pulse fashion, the plunger 112 is attracted and the latch lever 108 is rotated through a flange 114 formed on the plunger 112 against the bias of the spring (not shown) to disengage the hook portion 109 from the swing lever 94. As a result, the swing lever 94 is clockwise rotated by the bias of the tension spring 96 and thus the frictional wheel 97 abuts against the capstan 44 and then is drivingly rotated in the direction of the arrow as shown. When the frictional wheel 97 is about to make a full rotation round its axis, the end of the swing lever 94 engages the hook portion 109 of the latch lever 108 so that the swing lever 94 is again retained by the latch lever 108. And, when the frictional wheel 97 makes a rotation, abutment of the frictional wheel 97 against the capstan 44 is caused to be zero to stop rotation of the frictional wheel 97 as previously explained by reference to FIG. 6. That is, the frictional wheel 97 makes one rotation whenever the solenoid 111 is energized in pulse fashion. Rotation of the frictional wheel 97 is reduced and is imparted through the gears 99, 93 to the face cam 90. The ratio of gear with respect to the gear 99 and the gear 93 is designed to be 1 : 4 so that the face cam 90 is made retatable to form an angle of 90° whenever the frictional wheel 97 rotates round its axis. Since the flat steps of the face cam 90 are four in number to form an angle of 90° therebetween, the magnetic head is caused to be shifted by one step whenever the solenoid 104 or 112 is made to control current supply in pulse manner.

As described above, it will be understood that according to magnetic head shifting means shown in FIGS. 5 to 7, the magnetic head 45 may be positioned at four different predetermined fixed points across the width of the tape 81 to reproduce the four record tracks on the tape 81.

Figure 8:
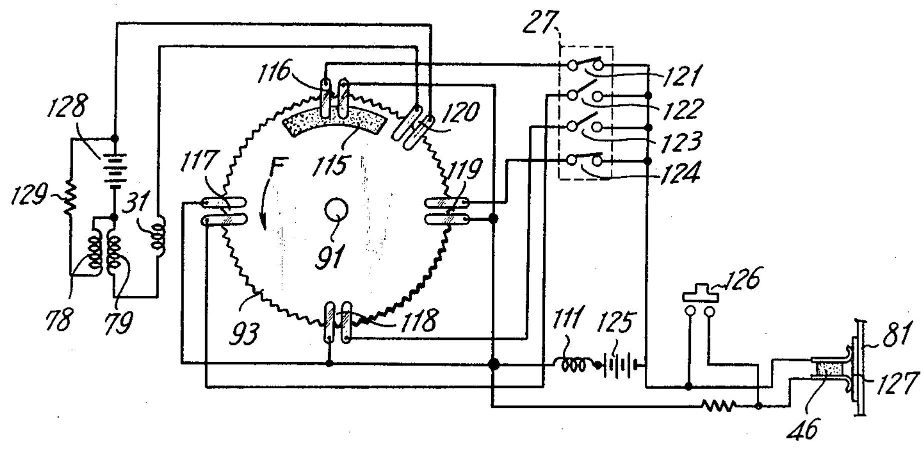
FIG. 8 is a representation showing a control circuit for effecting control for rotation of the solenoid in FIG. 7 and control for current supply to the electromagnet in FIG. 1, for current supply to the solenoid in FIG. 2.

Referring to FIG. 8, means is shown for controlling rotation of the face cam 90 by controlling the current supply to the solenoid 111. In the drawing, similar numerals are used to illustrate like parts in FIGS. 1 to 7.

A rotary switching means, which is operated by the shaft 91 is constituted by gear or rotary disk 93 made of insulating a material having a conductive piece 116 mounted to the surface of the gear 93. Switches 117 to 120 each consisting a pair of contacts are mounted to a fixed member (not shown) of insulation, which is provided corresponding to the gear 93. The switches 116 to 119 are spaced to form an angle of 90° to one another and the switch 120 is provided between the switches 119 and 116. Normally opened track selecting switches 121 to 124 received in the switch block 27 (FIG. 2) are, as shown in FIG. 8, connected in series with the respective switches 116 to 119. The solenoid 111 in FIG. 7 is connected in series to power source 125 through the switches 116 to 119 and the track selecting switches 121 to 124. The solenoid 111 is also connected through a pushbutton switch 126 in series with the source 125. The endmark detector 46 (FIG. 1) is connected in parallel with the pushbutton switch 126. The endmark detector 46 consists of two feeler contacts that are shorted by a conductive patch 127 on the tape 81 within the cartridge and member of insulation for supporting the feeler contacts. The switch 120, solenoid 31 (FIG. 2), the second coil 79 of the electromagnet 76 (FIG. 1), and an electrical source 128 are connected in series with one another. The first coil 78 of the electromagnet 76 is connected to the source 128 through a resistor 129 and is normally supplied with a relatively weak current. The intensity of the magnetic flux generated from the first coil 78 by this weak current is so adapted that it can attract intensely and engage with the magnetic piece 75 on the reciprocating lever 51 (FIG. 1) when the open end of the magnetic circuit of the core 77 (FIG. 1) is closed by the magnetic piece 75, but it cannot attract the magnetic piece 75 when the magnetic piece 75 is away from the core 77. The switch 120 as will be detailed later is closed by the conductive piece 115 on the gear 93 so that the current from the source 128 is applied to the second coil 79 of the electromagnet 76 and the solenoid 31. The direction of current flowing in the second coil 79 is such that it eliminates the magnetic flux generated in the first coil 78, so that when the magnetic piece 75 is attracted by the core 77, the current from the source 128 flows in the second coil 79, and the attraction of the magnetic piece 75 is released. Accordingly, relating to closing of the switch 120, retention of the reciprocating lever 51 by the electromagnet 76 is released to move the lever 51 by the bias of the tension spring 60. When the switch 120 is closed, the solenoid 31 is energized by the source 125 to allow the swing plate 28 (FIG. 2) to be swung in the direction of the arrow C by the plunger for the solenoid 125 to release engagement of the pushbutton rods 23 to 26 with the actuators **121*a* to 124*a* of the track selecting switches 121 to 124. As a result, the container 10 (FIG. 1) is rotated to bring the next cartridge to the playing position. In other words, exchange of the cartridge to be played is automatically effected by closing the switch 120**.

FIG. 8 shows that the track selecting switches 121 and 124 are closed by operation of the actuators **121*a* and 124*a* by means of the depressed pushbutton rods 23 and 26 (FIG. 2). As shown, when the switch 116 is closed by the conductive piece 115 on the gear 93, the solenoid 111 is energized by the source 125 since the track selecting switch 121 has been closed. Energization of the solenoid 111 will cause the gear 93 to be rotated by means shown in FIG. 7 in the direction of the arrow F to form an angle of 90°. With rotation of the gear 93, the conductive piece 115 is moved to a position where it closes the switch 117. The switch 122 which is connected in series with the switch 117 is opened and therefore current supply to the solenoid 111 is cut off. Thus, the gear 93 is sustained at a position where the conductive piece 115 closes the switch 117. At this time, the face cam 90 (FIG. 5) is in a position where the magnetic head 45 faces to the second track on the tape 81. For this reason, the second track on the tape 81 is played. Upon completion of the second track, the feeler contacts of the endmark detector 46 is shorted by the conductive patch 127 on the tape 81, and the solenoid 111 is energized by the source 125. With respect to energization of the solenoid 111, the gear 93 is made rotatable through an angle of 90° to move the conductive piece 115 to a position where it closes the switch 118. At this time, the magnetic head 45 is moved by the face cam 93 to a position where the third track on the tape 81 is played. In the course wherein the third track is played, if the pushbutton switch 126 is manually closed or the feeler contacts of the endmark detector 46 are shorted due to completion of the play of the third track, the solenoid 111 is energized. In relation to energization of the solenoid 111, the gear 93 is made rotatable to form an angle of 90° to move the conductive piece 115 to a position where it closes the switch 119. The track selecting switch 124 connected in series with the switch 119 is closed so that current supply is maintained applied to the solenoid 111 to rotate the gear 93 to form an angle of 90° thus causing the conductive piece 115 to be moved to a position where it closes the switch 120. When the switch 120 is closed by the conductive piece 115 there is an exchange of the cartridge to be played. Assuming that the rod 23 out of the pushbutton rods 23 to 26 corresponding to the cartridge to be played is not depressed, then track selecting switch 121 is opened since the actuator 121a of the track selecting switch 121 is not operated. Therefore, rotation of the gear 93 is stopped in a position where the magnetic piece 115 closes the switch 116. At this moment, the face cam 90 is in a position where it moves the magnetic head 45 to the first track on the tape 81 so that the first track is played. To the contrary, if the pushbutton rod 23 is depressed, the actuator 121*a* of the track selecting switch 121 is operated by the rod 23 so that the switch 121 is closed to energize the solenoid 111 thus rotating the gear 93** to form an angle of 90°.

As described above, rotation of the gear 93 and the face cam 90 is controlled by the track selecting switches 121 to 124 to select the record-track to be played. It will be readily understood that upon manual operation of the pushbutton rods 23 to 26 provided to the support elements 19 to 22 corresponding to the respective cartridges 13 to 16 received in the container 10, designation of the cartridge to be played and of the record-track to be reproduced is effected and thus designated cartridge and record-track are automatically selected to be played.

It is to be understood that changes and variations may be made without departing from the spirit and scope of the invention as defined in the appended claims.

What is claimed is:

1. In a tape player for playing a plurality of endless magnetic tape cartridges including a capstan for driving the magnetic tape and means for reproducing said tape, comprising:

a movable container having a receptacle portion slidably holding a plurality of cartridges therein and being movable to bring any of said cartridges to a predetermined position;

means for moving said container;

stop mean for stopping movement of said container which is being movably driven by said moving means at a point where a selected cartridge is moved to the predetermined position;

cartridge shifting means for moving said cartridge brought to said predetermined position toward a playing position and for further moving the same from said playing position to said predetermined position, said cartridge shifting means including a reciprocating lever mounted on said container for reciprocal movement between said predetermined position and said playing position, said reciprocating lever having first and second arms for clamping the rear edge and the front edge of said cartridge and thereby engaging the cartridge for movement by said reciprocating lever, and driving means for reciprocally driving said reciprocating lever, said driving means including a tension spring for biasing said reciprocating lever in a direction in which said cartridge is moved from said playing position to said predetermined position, a swing lever, means remote from said reciprocating lever for mounting said swing lever for pivotal movement, a frictional wheel rotatably mounted on said swing lever, a rotary member rotatably provided on said swing lever, transmission means for transmitting rotation of said frictional wheel upon reduction of the speed thereof to said rotary member, and a connecting member for connecting an eccentric position of said rotary member to said reciprocating lever, said swing lever being operable to be swung through movement of said reciprocating lever under the bias of said tension spring, said movement being transmitted to said swing lever to swing the same by means of said connecting member and said rotary member, to a position where said frictional wheel is rotatably driven by abutment against the capstan, rotation of said frictional wheel being imparted through said transmitting means to said rotary member to rotate the latter thereby reciprocating said reciprocating lever, an electromagnetic device for stopping movement of said reciprocating lever when said reciprocating lever is moved to the position where said cartridge is moved to said playing position and for holding said reciprocating lever against the bias of said tension spring so that said cartridge is held in said playing position, said electromagnetic device being operable to relieve the bias of said tension spring urging said swing lever through said connecting member into abutment with said capstan whereby said swing lever is swung to a position where said frictional wheel is away from said capstan;

a control circuit means for controlling current supply to said electromagnetic device, said control circuit means controlling current supply to said electromagnetic device so that the latter is released from said reciprocating lever in response to a signal denoting the end of the play of said cartridge, said reciprocating lever being moved under the bias of said tension spring in a direction in which said cartridge is moved from said playing position to said predetermined position, said container being moved in response to returning of said cartridge to said predetermined position and a second cartridge being brought to said predetermined position and held between said first and second arms, said reciprocating lever being moved by said driving means to bring said cartridge to said playing position and being played by said reproducing means.

* * * * *